United States Patent [19]

Petitjean et al.

[11] 3,889,214

[45] June 10, 1975

[54] PASS-BAND FILTER HAVING ELECTRONICALLY ADJUSTABLE MIDFREQUENCY

[75] Inventors: Christian H. Petitjean, Fontenay-aux-Roses; Maurice E. L. Marchand, Sevran; Marcel Denis, Paris, all of France

[73] Assignee: International Standard Electric Corporation, New York, N.Y.

[22] Filed: May 6, 1974

[21] Appl. No.: 467,045

[30] Foreign Application Priority Data

May 18, 1975 France .............................. 73.18092

[52] U.S. Cl. .......... 333/73 R; 333/73 W; 333/84 R; 333/98 R

[51] Int. Cl. .......................... H01p 1/20; H01p 7/10

[58] Field of Search ... 333/73 R, 73 C, 84 R, 84 M, 333/70 S, 70 R, 97 R, 98 R; 334/15

[56] References Cited

UNITED STATES PATENTS

| | | | |
|---|---|---|---|
| 3,348,173 | 10/1967 | Matthaei et al. | 333/84 X |
| 3,391,356 | 7/1968 | Bolljahn et al. | 333/84 X |
| 3,539,953 | 10/1970 | Jones | 333/73 |
| 3,649,937 | 3/1972 | Carlson | 334/15 |

*Primary Examiner*—James W. Lawrence
*Assistant Examiner*—Marvin Nussbaum
*Attorney, Agent, or Firm*—John T. O'Halloran; Menotti J. Lombardi; Richard A. Menelly

[57] ABSTRACT

A pass-band comb filter utilizes a series of strips and varactors in combination to form parallel resonant circuits at a particular frequency. The pass-band midfrequency can be varied in response to the bias voltage applied to the varactors. Additional capacitors and input and output strips are used to compensate for the insertion attenuation and for matching source and load impedance.

4 Claims, 6 Drawing Figures

PASS-BAND FILTER HAVING ELECTRONICALLY ADJUSTABLE MIDFREQUENCY

BACKGROUND OF THE INVENTION

This present invention relates to pass band filters using varactors and tuning capacitors. More particularly, it relates to pass band comb filters which are particularly usable within the GHz frequency range. At GHz frequencies lumped constant circuits comprising capacitors and self-inductances are difficult to utilize due to their low Q. Filters using wave guides as supports may produce satisfactory results while leading to cumbersome designs. Structures better suited for utilization at these frequencies have been sought; for example, having "sandwich" and "triplate" type structures. One type of filter utilizing these structures is called "comb filter." It comprises parallel strips located within a very flat casing, each strip having one of its ends secured to a casing sidewall. The strip length is approximately equal to $\lambda o/8$, $\lambda_o$ being the wavelength corresponding to the pass band midfrequency in the dielectric medium. The strips, each being associated with a capacitor which connects its other end to the casing, form parallel resonant circuits at the design frequency. Strip intercoupling is produced by electromagnetic leakage fields. Two non-resonant terminal strips provide filter coupling to the source and the load, respectively.

Typically these filters have several important and significant advantages. Since strips are secured to a casing sidewall, utilization of dielectric supports is avoided. The casing sizes are reduced since a filter with midfrequency of 1 GHz has a width of about 5 cm and an inside length necessary for locating four resonant strips and two input and output matching strips of about 6 cm. The strips being short and solidly secured to the casing sidewall reduce vibration effects. From a technical point of view, further advantages may be indicated. The second harmonics are suppressed because the strips are, for those harmonics, resonant circuits coupled by very high impedances. When the strip length is about $\lambda o/8$, the attenuation curve slope is considerably increased beyond upper frequency of the pass band. Resonant circuit intercoupling can easily be adjusted by varying the strip spacing.

These qualities enable comb filters to be used in radio-navigation equipment. To be more specific, certain modern applications will be mentioned as interrogators in TACAN systems, wherein transmitters and receivers may either transmit or receive on a great number of close channels; for example, 240 channels within a range from 960 MHz to 1,200 MHz, wherein transmission and reception frequencies in a channel are spaced by an intermediate frequency of 60 MHz.

To avoid image frequency effects preselectors have to be introduced which are in the form of pass band filters having attenuation curves rapidly climbing outside the pass band.

The minimum number of those filters is equal to four when filter switching is made by known processes. However, with four filters it is conceivable that for channels located in a border area between two filters image frequency effects are not suppressed because the filter attenuation curve slope in the proximity of the pass band is not infinite. To avoid this drawback the number of filters must be increased. For instance, six filters may be provided instead of four, each having a pass band of 40 MHz, but in this case size becomes prohibitive and filter switching problems become pronounced.

SUMMARY OF THE INVENTION

One purpose of the present invention is to substitute a single filter for a number ($p$) of switchable "adjacent" filters of band width $\Delta f_o$, the single filter having the same band width $\Delta f_o$, but having a midfrequency $F_o$ which may be varied over all the range $F_o = p\ \Delta f_o$ by electronic means.

According to a feature of this invention fixed capacitors associated with the resonant circuits are replaced by varactors or voltage variable capacitors so that pass band switching is performed by varying the bias applied to each varactor, the bias variation being either continuous or discrete.

According to another feature of this invention, varactors have their own Q high enough and operate under high bias voltage V so as to reduce responsiveness dC/dV. Thus, filter preformances are further free from midfrequency jitter which could result from important capacitance variations due to temperature effect occuring when utilizing low voltage operated varactors.

According to this invention, the major interest of varactor utilization with high bias voltage is in relation with the fact that internal resistance $r_i$ serially connected with capacitance C decreases with C. In such a manner unloaded $Q_1$ for resonant circuits — to the extent that losses have no other origin than resistance $r_i$ — is increasing with frequency.

In a comb filter using no-loss capacitors frequency band and insertion attenuation curve, both in pass band range and in attenuated range, are basically depending on a coupling factor which must be higher than 1 and is expressed by the ration $$u' = R/Z_o' \cot \theta_o,$$

wherein:

- $R$ is the source resistance from filter input or load resistance from filter output,
- $Z_o'$ is a coupling impedance between the strips as determined by their arrangement, and
- $\theta_o$ is an angle proportional to the frequency which is $\pi/4$ when filter strip length is of $\pi o/8$.

$Q_o$ being the $Q$ of resonant circuits loaded by resistor R, coupling factor becomes:

$$u' = \frac{R}{Z_o'} \quad \frac{\cot \theta_o}{1 + \frac{Q_o}{Q_1} \cot^2 \theta_o}$$

The term $Q_o/Q_1 \cot^2\theta_o$ being a function rapidly decreasing with frequency, $u'$ may be maintained constant when $\theta_o$, that is frequency, is varying within certain limits.

Therefore, according to a further feature of this invention, insertion loss curves remain identical for each position within frequency band $\Delta F_o$, due to a reduction of coupling impedance $Z_o'$ by a ration from 1 to $$\frac{1}{1 + \frac{Q_o}{Z_1} \cot^2 \theta_o}$$

Varactor utilization is accompanied by an absorption loss which effects low frequencies more than high frequencies in band $\Delta F_o$. The varactor assembly is controlled by a single bias and the capacitance addition for each resonant circuit is provided by a simple settable air capacitor, such as a conventional capacitive screw. Due to such an arrangement only one voltage source may be used to control the varactors which may be utilized with high bias voltage. Such an arrangement is also of advantage when "Chebishev" performance filter is utilized wherein while resonant circuits have the same electric length they have different characteristics and then also different associated capacitances.

Other features of the present invention will appear more clearly from the following description of embodiments, the said description being made in conjunction with the accompanying drawings, wherein:

DESCRIPTION OF THE PREFERRED EMBODIMENT

Figure 1:
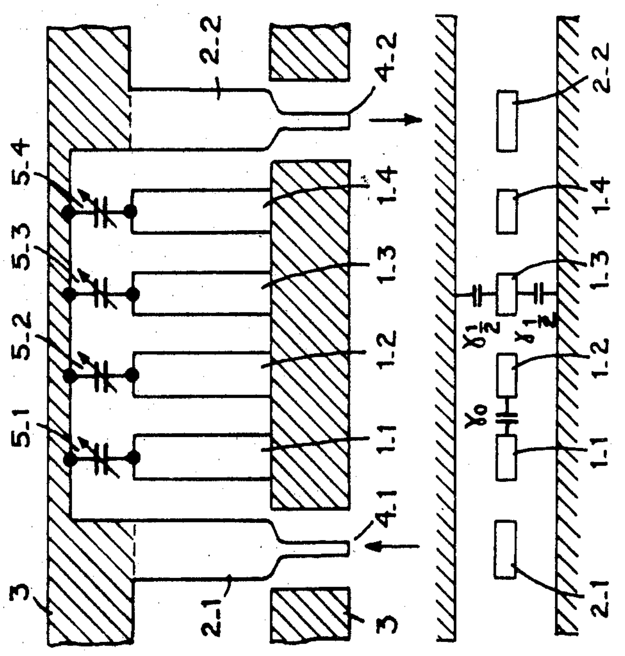
FIG. 1 is a schematic view of a comb filter according to this invention.

FIG. 1 shows two cross-sectional views, along two normal planes, of a comb filter comprising four active strips and two additional strips for matching both source and load impedances.

Strips 1-1, 1-2, 1-3, and 1-4, each having one end secured to casing 3, are respectively terminated at the other ends by capacitors which are varactors 5-1, 5-2, 5-3 and 5-4 provided with biasing means which will be hereafter described. Free sides of varactors are RF short-circuited to casing 3.

Strips 2-1 and 2-2 respectively operate to match filter input and output with source and load impedances which are, for instance, impedances of coaxial cables 4-1 and 4-2.

Lengths of the six strips are equal to or less than λo/8, where λo is the pass band midfrequency.

Reference being made to the lower cross section shown in FIG. 1, it is to be noted that each strip has a capacitance $\gamma_1$ per unit of length with respect to the casing, that capacitance $\gamma_1$ varying with the thickness and width of the considered strip. Likely two adjacent strips are coupled by a capacitance $\gamma_o$ per unit of length, $\gamma_o$ varying with strip thickness and spacing.

Strips associated to the casing constitute propagation lines having a low characteristic impedance $Z_o$, i.e. $Z_o = 1/\gamma_1 \nu$, $\nu$ being electromagnetic wave velocity through dielectric medium surrounding the strips. Likely two adjacent strips constitute a propagation line having a characteristic impedance $Z_o'$ which is substantially higher than $Z_o$, with $Z_o' = 1/\gamma_o \nu$.

Example of a Pass Band Filter with Two Active Strips

In order to well understand the behavior of the pass band filter using varactors as strip tuning capacitors, an embodiment of filter provided with two active strips will be considered.

The two active strips associated to the casing represent shortcircuited lines having impedance $j\,Z_o \tan\theta$, $\theta$ being equal to $\omega l/v$ where $\omega$ is angular frequency $2\pi F$ and $\theta$ is equal to or less than $\pi/4$.

Short-circuited lines are terminated at their free ends by capacitors $C$. Parallel resonance is produced at frequency $F$ when:

$$C\omega Z_0 = \cot\theta$$

The two resonant circuits are coupled by a short-circuited line of impedance:

$$j\,Z_o' \tan\theta.$$

Filter input and output resistors R are those which are obtained in converting source and load impedance $\rho$ by means of the two side lines constituted by additional strips associated to the casing.

If $Z_1$ is characteristic impedance of the line formed by the first filter strip and the additional input strip and $Z_2$ is characteristic impedance of the line formed by additional input strip and the casing, it results therefrom $R = \rho\,(Z_1/Z_2)^2$. If it is a narrow band filter, $R$ is necessarily large with respect to $Z_o$, as will be explained in the following, and, as $\rho$ has about the same value as $Z_o$, the additional input strip operates as an impedance booster transformer. The same consideration is valuable for additional output strip.

Figure 2:
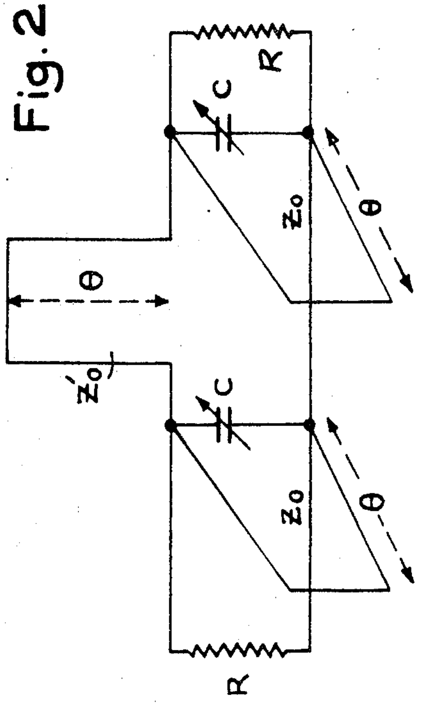
FIG. 2 illustrates the elements which characterizes a comb filter comprising two resonant strips.

The filter, as shown in FIG. 2, brings between the two resistors R an insertion attenuation which may be easily computed according to the theory of quadripols.

In dB that insertion attenuation is written:

$$A\ \mathrm{dB} = 10\log_{10}(h_2^2 + 1)$$

where $h_2$ is the ratio:

$$h_2 = \frac{Z_o'}{2r\cot\theta}\quad 1 + \frac{R^2}{Z_o^2}(\cot\theta - C\omega Z_o)\qquad \left(1 + \frac{2Z_o}{Z_o'}\right)\ \cot\theta - C\omega Z_o \qquad (A)$$

Formula $A$ entirely defines the behavior of the filter in the pass band and out of the pass band;

Assuming that $R^2/Z^2$ and $Z_o'/2Z_o$ are relatively higher than 1, it is to be noted that poles of function $h_2$ correspond to angular frequencies $\omega$ between the two frequencies $\omega_1$ and $\omega_2$ for which $\cot\theta_1 - C\omega_1 Z_o = 0$ and $$\cot\theta_2 - \frac{C}{1 + \frac{2Z_o}{Z_o'}}\omega_2 Z_o = 0,$$

$\omega_1$ being the natural angular frequency for each of the resonators and $\omega_2$ being a frequency symmetrical of $\omega_1$ with respect to band midfrequency $\omega_o$, $\omega_o$ being defined by $$\mathrm{COT}\ \theta_o \times \frac{C}{1+\frac{Z_o}{Z_o'}}\omega_o Z_o = 0.$$

It is still to be noted that $h_2$ has zeros for the two frequencies $\omega_1'$ and $\omega_2'$, difference $\overline{\Delta\omega_o} = \omega_2' - \omega_1'$ being written $$\overline{\Delta\omega_o} = \omega_o\, s(\theta_o)\ \frac{Z_o}{R}\ \sqrt{\frac{R^2}{Z_o'^2}\cot^2\theta_o - 1}$$

where $$s(\theta_o) = \frac{2\tan}{1+\theta_o\cot\theta_o+\tan\theta_o}$$

Other things being equal factor $s(\theta_o)$ increases when $\omega_o$ does the same, $R/Z_o'\cot\theta_o = u$ is a coupling factor. $u = 1$ defines the critical coupling.

It is still to be noted that in the pass band $h_2$ reaches a maximum value $h_{max}$ for angular midfrequency $\omega_o$.

$$h_{max} = \tfrac{1}{2}\ (u - \frac{1}{u})$$

and then $$A_{max}dB = 20\ \log_{10}\ \frac{u^2+1}{2u} \qquad (B)$$

The same insertion attenuation appears again for frequencies which are respectively lower and upper than $\omega_2'$ and $\omega_1'$.

$$\text{Interval } \overline{\Delta\omega_t} = 2\pi\ \overline{\Delta f_o} = \sqrt{2}\,\omega_o\, s(\theta_o)\ \frac{Z_o}{R}\ \sqrt{u^2-1} \qquad (C)$$

conventionally defines the filter bandwidth.

To be noted that maximum attenuation and coupling factor are closely related. In other words, as soon as $A_{max}$ is defined coupling factor is univocally determined.

Out-band attenuation may be characterized by insertion attenuation at frequencies $\omega_1$ and $\omega_2$, i.e.

$$A_{\omega_1} = 10\ \log_{10}(1 + \tfrac{1}{4}\,u^2) \qquad (D)$$

Under $\omega_1$ and above $\omega_2$ attenuation rapidly increases in accordance with a law only depending on u.

Also to be noted that, for any assumption, when angle $\theta$ approaches $\pi/2$, in other words when lines become naturally resonant (quarter wave lines), $A_{max}$ increases to $\alpha$ and $A_{\omega_1}$ is reduced to 0. The pass band filter becomes a band rejection filter.

Accordingly use of strips having length equal to or less than $\lambda o/8$ is justified, length of $\lambda o/8$ enabling 2nd harmonics to be removed, which often is technically wished.

Up to now assumption has been made that filter components would correspond to pure reactances. Typically there are losses and, particularly when using varactors, losses are basically due to internal resistance $r_i$ in series with each varactor capacitance.

In a general manner if the two resonators are lossy they have their own finite $Q$. Each resistor $R$ is to be considered as mounted in parallel with a resistance $Z_oQ\tan\theta_o$, and R' must be substituted for R in (A), (B), (C) and (D), with $$R' = \frac{RZ_o\,Q\tan\theta_o}{R + Z_o\,Q\tan\theta_o}$$

which results in $$A_{max}dB = 20\ \log_{10}\ \frac{u'^2+1}{2u'} \qquad (B)$$

$$\overline{\Delta\omega_t} = \sqrt{2}\,\omega_o\, s(\theta_o)\ \frac{Z_o}{R}\ (1 + \frac{R}{Z_oQ}\cot\theta_o)\ \sqrt{u'^2-1} \qquad (C)$$

$$A_{\omega_1} = 10\ \log_{10}(1 + \tfrac{1}{4}u'^2) \qquad (D)$$

with $$u' = \frac{u}{1+\frac{R}{Z_oQ}\cot\theta_o} = \frac{\frac{R}{Z_o'}\cot\theta_o}{1+\frac{R}{Z_oQ}\cot\theta_o}$$

Should only insertion attenuation is considered it is to be noted that the same characteristics may be find by reducing $Z_o'$ when Q is known.

An increase of bandwidth $\overline{\Delta\omega_t}$ may even be recognized due to the factor $(1 + R/Z_oQ\cot\theta_o)$.

But absorption attenuation must also be taken into account since it indeed results from series resistance of varactors. In the case of two varactors, absorption attenuation is:

$$A' = 20\ \log_{10}\ (1 + \frac{R}{QZ_o}\cot\theta_o)$$

It affects in a same manner any frequency does to $F_o$.

When, according to this invention, midfrequency $F_o$ is varied by varying biases applied to varactors, it results therefrom variations of capacitance C and Q. Without special care, $\overline{\Delta\omega_t}$, $A_{max}$ and $A_{\omega_1}$ are varying with midfrequency $F_o$ over the whole electronic tuned band: $\Delta F_o = p\Delta f_o$.

Indeed a purpose of this invention is to define a relation between varactor characteristics and comb filter characteristics so as to reduce to minimum variations of the above mentioned quantities over electronic tuned band.

In any assumption it will be selected a varactor having a relatively high Q so as to reduce A'.

In a varactor, the width of the neutral area is given from equation:

$$e_1 = k\ (V + v)^{\beta}$$

$\beta$ being equal to ½ for alloyed junctions and to ⅓ for deep diffused junctions. V measures negative bias voltage and $v$ negative contact voltage, $v$ being of about 0.65 V.

Varactor capacitance $C$ is given from equation:

$$C = \frac{S\epsilon}{R_1} = \frac{S\epsilon}{k(V+V)^{\beta}}$$

S being junction area and being electric permittivity of the utilized semiconductor material.

It immediately appears that the higher is V the smaller is dC/dV. According to this invention varactor is operated under high voltage V so as to provide filter operation stability and to make it particularly not responsive to temperature effects which affect v.

Another advantage, which is probably the more important advantage in operating at high voltage V will now be described.

Varactor has the same behaviour as a capacitance in series with a resistance, the whole being shunted by a high resistance $R_e$ which symbolizes all the other varactor losses. For a capacitance $C$ corresponding to bias $V$, $Q$ is, for the varactor:

$$\frac{1}{Q} = C\omega r_i + \frac{1}{C\omega R_e} = \frac{1}{Q_1} + \frac{1}{Q_2}$$

$Q_2$ is the limit $Q$ of the varactor when $r_i$ is reduced to zero. By replacing $C\omega$ by its value:

$$C\omega = \frac{\cot\theta_o}{Z_o}$$

It results:

$$\frac{1}{Q} = \frac{\cot\theta_o}{Z_o} r_i + \frac{Z_o}{R_e \cot\theta_o}$$

Therefore coupling factor becomes:

$$u' = \frac{\frac{R}{Z'}\cot\theta_o}{1 + \frac{R}{R_e} + \frac{Rr_i}{Z_o^2}\cot\theta_o}$$

Absorption attenuation is:

$$A' = 20\log_{10}\left(1 + \frac{R}{R_e} + \frac{Rr}{Z_o^2}\cot\theta_o\right)$$

Resistance $r_i$ is written:

$$r_i = \frac{\rho_o}{S}(e_2 - e_1)$$

where $\rho_o$ is resistivity in base region and $e_2$ is base region thickness for a very low value V. When V increases, $e_1$ also increases and, as a limit, when bias $V_r$ is of about 150 V, close to breakdown voltage, $(e_2 - e_1)$ becomes null as well as $r_i$.

With bias $V_r$ capacitance C has the value $C_r$ and $r_i$ may then be written:

$$r_i = \frac{\pi_o\epsilon}{C_r}\left(1 - \frac{C_r}{C}\right) = r_o\left(1 - \frac{C_r}{C}\right)$$

Considering coupling factor $$u' = \frac{R}{Z_o'}\,\frac{\cot\theta_o}{1 + \frac{R}{R_e} + \frac{Rr_i}{Z_o^2}\cot^2\theta_o}$$

it may be made constant over band $\Delta F_o$ if $u'$ is minimum for the value of $\theta_o$ corresponding to maximum value $F_c$ of band $\Delta F_o$.

The function $$y = \frac{\cot\theta_o}{1 + \frac{R}{R_e} + \frac{Rr_i}{Z_o^2}\cot\theta_o}$$

is minimum when $dy/d\theta_o = 0$.

Calculation of that derivative, taking into account the law of $r_i$ versus $C$, leads to the following condition, for frequency $F_c$:

$$1 + \frac{R}{R_e} + \frac{Rr_i}{Z_o^2}\cot^2\theta_o = \left(1 + \frac{R}{R_e}\right)\left(1 + \frac{1}{1 + \frac{C_r}{C - C_r}\phi(\theta_o)}\right)$$

where $\phi(\theta_o)$ varies with $\theta_o$:

$$(\theta_o) = 1 + \frac{1}{\theta_o(\tan\theta_o + \cot\theta_o)}$$

which varies from 1.76 to 1.64 when $\theta_o$ goes from $\pi/5$ to $\pi/4$.

In the following assumption will be made that at frequency $F_c$, $\theta_o = \pi/4$ and thus $\phi(\theta_o) = 1.64$.

Attenuation $A'_{min}$, at frequency $F_c$, is:

$$A'_{min} = 20\log_{10}\left(1 + \frac{R}{R_e}\right) + 20\log_{10}\left(1 + \frac{1}{1 + 1.64\frac{C_r}{C - C_r}}\right)$$

At the other end of the pass band $F_c - \Delta F_o$ $$\left(1 + \frac{R}{R_e} + \frac{Rr_i}{Z_o^2}\cot^2\theta_o\right)$$

is increasing as $\cot\theta_o$ and with the assumption that relative band is small, the increase is equal to $1 + 2(\Delta F_o/F_c)$.

Maximum attenuation $A'_{max}$, at the lowest frequency of the band $F_c - F_o$, is:

$$A'_{max} = A'_{min} + 20\log_{10}\left(1 + \frac{2\Delta F_o}{F_c}\right)$$

Assumption being for instance made that alloyed structure type varactor is selected, with a maximum bias value of 100 V, $C/C_r$ is equal to 1.22 and $C_r/(C - C_r)$ is equal to 4.5.

Selecting a relative band $F_o/F_c = 0.1$ and neglecting losses caused by $(1 + R/R_e)$, it results $$A_{min}' = 2 \text{ dB and } A_{max}' = 3.6 \text{ dB}$$

Those values may be considered as excessive. Therefore in most cases, the varactor will be only assigned to provide capacitance variation over the band, the addition being provided by a very-low-loss air-type fixed capacitor having a fixed capacitor $C_f$.

In such conditions, calculation of derivative $dy/d\theta$ leads to a new equation:

$$1+\frac{R}{R_c}+\frac{Rr_i}{Z_o^2}\cot^2\theta_o=\left(1+\frac{R}{R_c}\right)\left(1+\frac{1}{1+1.64\,\frac{C_r}{C-C_r}\,\frac{C_f+C}{C}}\right)\quad (E)$$

Thus $$A'_{min}=20\log_{10}\left(1+\frac{R}{R_c}\right)+20\log_{10}\left(1+\frac{1}{1+1.64\,\frac{C_r}{C-C_r}\,\frac{C_f+C}{C}}\right)$$

$$A'_{max}=A'_{min}+20\log_{10}\left(1+\frac{2F_o}{F_c}\right)$$

With the assumption that $(C_f+C)/C = 3$, the previous numerical example gives:

$A'_{min} = 0.4$ dB
$A'_{max} = 2$ dB

As soon as maximum bias $V_{max}$ producing capacitance C and minimum bias $V_{min}$ producing capacitance $(C + \Delta C)$ corresponding to frequency $F_c - \Delta F_o$ have been selected, $A'_{min}$ and $A'_{max}$ as well as $(C_f+C)/C$ are practically determined as also are $\Delta C$ and $(C_f+C)$ as a function of $Z_o$.

Indeed it successively results:

$$(C_f+C)\,\omega_o=\cot\theta_o \quad \text{with } G_o=\frac{\pi}{4}$$

$$\Delta C=\frac{\pi}{2}+1\;(C_f+C)\,\frac{\Delta F_o}{F_o}=2.57\,(C_f+C)\,\frac{\Delta F_o}{F_o}$$

$$\frac{\Delta C+C}{C}=\left(\frac{V_{max}}{V_{min}}\right)^{1/2}=2.57\,\frac{C_f+C}{C}\,\frac{F_o}{F_c}+1$$

Thus $$\frac{C_f+C}{C}=0.39\,\frac{F_c}{\Delta F_o}\left[\left(\frac{V_{max}}{V_{min}}\right)^{1/2}-1\right]\quad (F)$$

With $$\frac{V_{max}}{V_{min}}=5$$

$$\frac{C_f+C}{C}=0.5\,\frac{F_c}{\Delta F_o}$$

If in addition $$\frac{C_r}{C-C_r}=4.5$$

it results $$A'_{min}=20\log_{10}\left(1+\frac{R}{R_c}\right)+20\log_{10}\left(1+\frac{1}{1+3.7\,\frac{F_c}{\Delta F_o}}\right)$$

$$A'_{max}=A'_{min}+20\log_{10}\left(1+2\,\frac{\Delta F_o}{F_c}\right)$$

The following Table I indicates values of $A'_{min}$, $A'_{max}$ and $C_f+C/C$ for several values of $\Delta F_o/F_c$. It is assumed that $R/R_c = 0$.

TABLE I

| $\Delta F_o/F_c$ | $A'_{min}(dB)$ | $A'_{max}(dB)$ | $C_f+C/C$ |
|---|---|---|---|
| 0.05 | 0.1 | 0.9 | 10 |
| 0.10 | 0.2 | 1.8 | 5 |
| 0.15 | 0.4 | 2.7 | 3.3 |
| 0.20 | 0.5 | 3.4 | 2.5 |
| 0.25 | 0.6 | 4.1 | 2 |

If pass band filter must have a relative electronic tuned band of 20 percent, $A'_{max}$ may be reduced from 3.4 down to 1.8 dB by sweeping the band $\Delta F_o$ in two half-bands $\Delta F_o/2$, varactors being utilized, as hereafter mentioned, first with a first capacitance $C_f'$ in the upper half-band, then with a second capacitance $C_f''$ in the lower half-band, $C_f''$ being larger than $C_f'$.

Up to now assumption has been made in calculations that the varactor could be selected in such a manner that $u'$ is constant over band $\Delta F_o$.

However considering the relation marking u' constant, it appears that:

$$\frac{Rr_i}{Z_o^2}\cot^2\theta_o=\frac{1}{1+1.64\,\frac{C_r}{C-C_r}\,\frac{C_f+C}{C}}$$

that is, since $\theta_o = 1/4$ and $Rr_i/Z_o^2$ is much smaller than 1, substantially:

$$1.64\,\frac{Rr_i}{Z_o^2}\,\frac{C_r}{C-C_r}\,\frac{C_f+C}{C}=1$$

and in replacing $r_i$ by its value $$r_i = \frac{\rho\upsilon\epsilon}{C_r}\left(1 - \frac{C_r}{C}\right)$$

$$1.64\,\frac{R}{Z_o^2}\,\rho_o\epsilon\,\frac{C_f+C}{C} = 1$$

or in introducing the value of $r_o$ that measures the serial resistance when V is low:

$$1.64\,\frac{Rr_o}{Z_o^2}\,\frac{C_r}{C}\,\frac{C_f+C}{C} = 1$$

that is in using equation $(F)$ and noting that $$\frac{C_r}{C} = \left(\frac{V_{min}}{V_r}\right)^{1/2}$$

$$0.65\,\frac{Rr_o}{Z_o^2}\left(\frac{V_{min}}{V_r}\right)^{1/2}\left[\left(\frac{V_{max}}{V_{min}}\right)^{1/2} - 1\right] = \frac{F_o}{F_c} \qquad (G)$$

Coefficient 0.65 results from the selection of $\theta_o = \pi/4$. Actually coefficient variation is very small when $\theta_o$ oscillates about $\pi/4$.

From (G), it appears that, if $V_{max}$, $V_{min}$ and $F_o/F_c$ are determined, the ratio $r_o/Z_o^2$ is also defined.

If $Z_o$ is known, selection will be made from varactor catalogue to find one bringing a suitable $r_o$. It may also be considered that resonator characteristic impedance $Z_o$ is fitted to a given value $r_o$.

Reversely if $r_o/Z_o^2$ is known as well as $V_{min}$ and $V_{max}$, relative band $F_o/F_c$ is then defined.

It will be noted that utilization of deep diffused junction type varactors would lead to replace exponent ½ by exponent ⅓ in (G).

That simple consideration immediately shows how alloyed junction varactors are of interest for the present application.

As varactor parameters are usually determined with respect to resonator parameters, as it has just been mentioned, $u'$ is from (E):

$$u' = \frac{R}{Z'_o}\cot\theta_o\,\frac{1}{1+\frac{R}{R_e}}\;\frac{1}{1+\dfrac{1}{1+1.64\,\dfrac{C_o}{C-C_o}\,\dfrac{C_f+C}{C}}}$$

Denominator terms that are due to unloaded condition losses may be evaluated as a function of $A'_{min}$(db) and it results:

$$u' = \frac{R}{Z_o'}\cot\theta_o\,10^{-\frac{A_{min}'}{20}}$$

The value $u$ with no unloaded condition losses may then be given to $u'$ by reducing $Z_o'$ from 1 to 10 $A'_{min}/20$, that is by practically reducing the tuned strip space interval in the same ratio.

Considering $(C)$ that gives $\overline{\Delta\omega_t}$, coefficient $\omega_o s(\theta_o)$ $(1 + R/Z_oQ \cot\theta_o)$ is proportional to $\theta_o s(\theta_o)\cot\theta_o$ which only varies by 10 percent in relative value when $\theta_o$ increases from $\pi/5$ to $\pi/4$.

Considering back $u' = \dfrac{R}{Z_o'}\;\dfrac{\cot\theta_o}{1+\dfrac{R}{R_e}+\dfrac{Rr_i}{Z_o^2}\cot^2\theta_o}$ it appears that, when using varactor at low values of $V$ for which $r_i$ substantially constant, $u'$ is then stationary when $$\frac{Rr_i}{Z_o^2}\cot^2\theta_o = 1 + \frac{R}{R_e}$$

and when $$A' = 20\log_{10}2\left(1 + \frac{R}{R_e}\right)$$

is higher than 6 dB.

That simple consideration shows the interest of using highly biased varactors, particularly due to increase of $r_i$ with capacitance $C$.

Example of pass band filters including more than two resonators

If a third strip is inserted into between the two previous mentioned strips which constitutes with casing a propagation line having a characteristic impedance $Z_o/2$, associated to a varactor having a capacitance 2C, the result is a three-element filter.

Calculation shows that, in this case, ratio $h_3$ is as a function of $h_2$:

$$h_3 = h_2\,\frac{2Z_o'}{Z_o\cot\theta}\left[\left(1+\frac{Z_o}{Z_o'}\right)\cot\theta - C\omega Z_o\right]$$

$h_3$ thus has the same poles as $h_2$ plus a third pole corresponding to $\omega_o$.

Frequency gap $\overline{\Delta\omega_o}$ in the present case the same as in the first case, i.e.

$$\overline{\Delta\omega_o} = \omega_o\,s(\theta_o)\,\frac{Z_o}{R}\left(\frac{R^2}{Z_o'^2}\cot^2\theta_o - 1\right)^{1/2}$$

It is to be noted that, within the pass band, $h_3$ reaches two equal maximum values producing a maximum in-band insertion attenuation of $$A_{max}dB = 10 \log_{10} \left[\frac{4}{27} \frac{(u^2-1)^3}{u^4} + 1\right]$$

with $$u = \frac{R}{Z_o'} \cot \theta_o.$$

Other things being equal this attenuation is substantially lower than in the first case.

Here insertion attenuation at frequencies $\omega_1$ and $\omega_2$ becomes A = 10 $\log_{10}(\mathbf{1} + u^2)$ Thus it is substantially higher than in the first case. Finally frequency interval $\overline{\Delta\omega_t}$ wherein insertion loss is at the most equal to $A_{max}$ is:

$$\overline{\Delta\omega_t} = 1.2\ \omega_o\ s(\theta_o)\ \frac{Z_o}{R}(u^2-1)^{1/2}$$

It appears that coupling factor $u = R/Z_o' \cot \theta_o$ determines the filter performances as in the case of a two-resonator filter. It is as the third resonator contributed only to reshape insertion attenuation curve.

Therefore the modified coupling factor $u'$ is the same as in a two-resonator filter and insertion attenuation curves are equalized in a same manner over the electronic tuned band $F_o$.

However losses in the third varactor increase absorption attenuation that becomes, taking into account that median resonator characteristic impedance is half of characteristic impedance of the two others:

$$A' = 20 \log_{10} \left[1 + \frac{R}{Z_o}\left(\frac{1}{Q} + \frac{1}{Q'}\right) \cot \theta_o\right]$$

Assumption being made that $Q' = Q$, term $R/Z_o\ (1/Q + 1/Q')$ is equal to 0.28 and $A'_{min}$ is of 2 dB at the maximum frequency $F_c$ of band $F_o$ when $F_o/F_c = 0.2$, and of 5 dB at the minimum frequency.

The same calculations may be made for a four-resonator filter, which leads to the same results with regard to coupling factor u that remains equal to $R/Z_o' \cot \theta_o$.

Over the pass band maximum insertion attenuation is substantially lower than for a three-resonator filter. There are four zero-attenuation frequencies interdigitated with three maximum attenuation frequencies.

Bandwidth $\overline{\Delta\omega_t}$ is $$\overline{\Delta\omega_t} = 1.1\ \omega_o\ s(\theta_o)\ \frac{Z_o}{R}(u^2-1)^{1/2}$$

At frequencies $\omega_1$ and $\omega_2$, outside the pass band, insertion attenuation A $$A\omega_1 = 10 \log_{10} \left[1 + \left(\frac{3u}{2}\right)^2\right]$$

Losses in the fourth varactor increase adsorption attenuation which becomes if assumption is made that fourth resonator characteristic impedance is equal to third resistor characteristic impedance:

$$A' = 20 \log_{10} \left[1 + \frac{R}{Z_o}\left(\frac{1}{Q} + \frac{2}{Q'}\right) \cot \theta_o\right]$$

Assumption being made that $Q' = Q$, maximum of term $R/Z_o\ (1/Q + 2/Q,)$ is equal to 0.42 and $A'_{min} = 3$ dB.

Still considering a relative electronic tuned band $\Delta F_o/F_c = 20$ percent, $\theta_o$ being equal to $\pi/4$ at the upper frequency and to $\pi/5$ at the lower frequency, $A'$ varies from 3 dB to 6 dB. With a relatibe band wherein $\Delta F_o/F_c$ = 10 percent, in the same other conditions, $A'$ varies from 2 dB to 4 dB.

Figure 3:
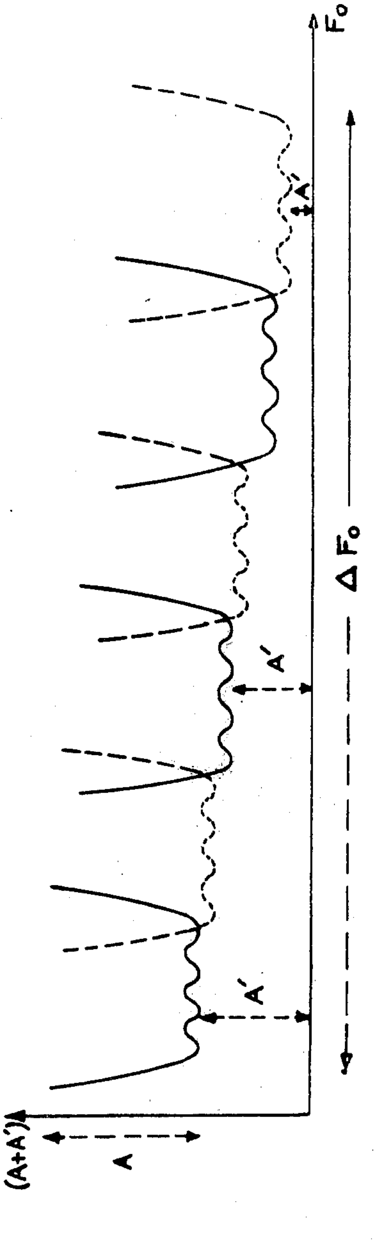
FIG. 3 shows response curves for a filter according to this invention.

FIG. 3 shows attenuation curve shapes for a four-resonator filter covering six portions, that is for six balues of bias voltages applied to the varactors one electronic tuned band from $F_o - \Delta F_o/2$ to $F_o + \Delta F_o/2$. Over each position bandwidth $\overline{\Delta\omega_t}/2\pi$ is slightly wider than $\Delta f_o$ so as to obtain sufficient laps. The six insertion loss curves A are substantially similar to each other with a slight widening of the pass band to higher frequencies of electronic tuned band. In addition each of them is identical to that which may be built with air capacitors. Finally absorption attenuation A' associated to each curve decreases when frequency increases.

These filters can be conventional $\pi$-filters with equal coupling impedances $jZ_o'$ tna $\theta_0$ between the resonators. Attenuation however does occur, particularly in the higher range. However, considerations based on the coupling factor $u$ and methods to hold the coupling factor constant in spite of losses occurring in the varactors can be employed within the scope of this invention.

Figures 4, 5, 6:
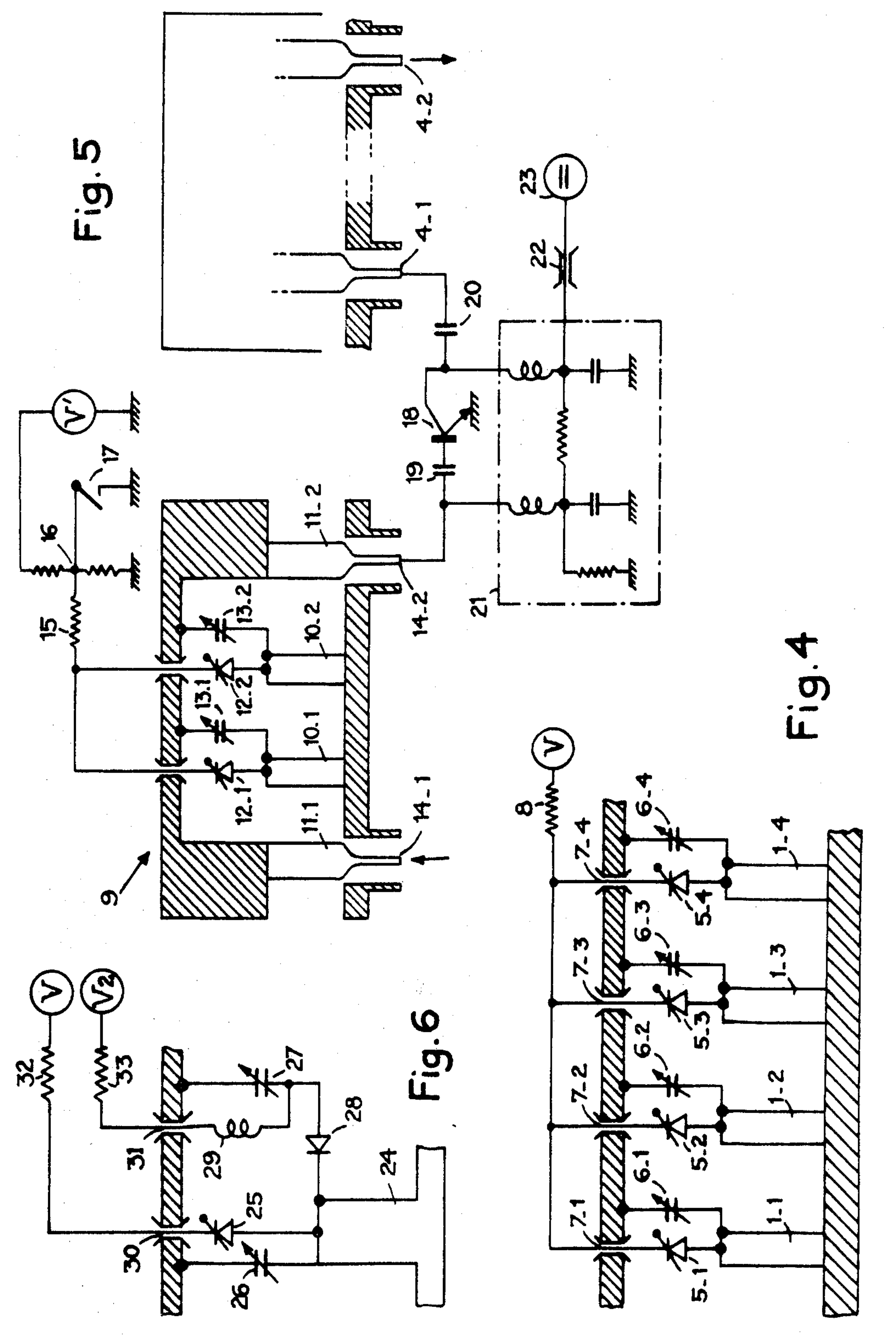
FIG. 4 illustrates another embodiment of a comb filter with varactors controlled by a single voltage.
FIG. 5 illustrates a preselector comprising two comb filters according to this invention, which are separated by an amplifier.
FIG. 6 shows an alternative of the strip-varactor arrangement.

FIG. 4 shows a filter according to this invention that includes four resonant strips. One adjustable capacitor, such as 6-1, 6-2, 6-3 or 6-4, is respectively mounted in parallel with one varactor 5-1, 5-2, 5-3 or 5-4. Capacitors 6 may be simple screws supported by the casing, which are more or less closed to strips 1-1 to 1-4.

Bias source V is common to every varactor that it supplies through a protection resistor 8 and insulator passages 7-1 to 7-4 having high capacitances. Tuning capacitances associated respectively to the four resonators have different values. Due to parallel capacitors 6-1 to 6-4 the needed capacitance variation ΔC for covering the whole electronic tuned band $\Delta F_o$ may be the same for the four resonators. Therefore the four varactors are utilized in the same conditions from a single bias source.

When a preselector, wherein a filter according to this invention is used, is mounted before a mixer, the loss of a few dB due to attenuation A' reduces the receiver sensitivity. Thus there is a need to first amplify the received signal in a low noise factor amplifier before applying it to the mixer. The comb filter structure, usually having a low impedance, is very convenient by using a transistor amplifier that is located within the casing.

An amplifier preselection device according to this invention is shown in FIG. 5.

A filter 9 includes two strips 10-1 and 10-2 associated to varactors 12-1 and 12-2 parallel mounted with adjustable capacitors 13-1 and 13-2. Two matching strips 11-1 and 11-2 are respectively coupled to input coaxial cable 14-1 and output coaxial cable 14-2. Varactors 12-1 and 12-2 are biased at a suitable value V through a protection resistor 15 and a potentiometer 16 from an adjustable voltage source V'. The under arm of 16 may be short-circuited by means of a switch 17 so that varactors have high capacitance when 17 is on.

Output 14-2 is coupled, via capacitor 19, to the base of transistor 18 having its collector coupled, via capacitor 20, to input 4-1 of a four-resonator filter similar to that shown in either FIG. 1 or FIG. 4. Transistor 18 is supplied from a subsidiary source 23 through a high-capacitance insulating passage 22 and a conventional R-L-C filter 21. 9, 18, 21 and the four-resonator filter may be located in the same casing.

Filter 9 has a pass bandwidth $\Delta f_o'$ wider than four-resonator filter bandwidth $\Delta f_0$ and may be tuned in the same electronic tuned band $\Delta F_0$. Maximum attenuation A' of 9 in band $\Delta F_0$ is, for instance, of 2 dB and four-resonator filter maximum attenuation may be of 4 dB. Amplifier 12 may have a gain of 10–15 dB with a noise factor of 4 dB. Applying equations giving total noise factor $F_T$ of a series of active and passive quadripole networks, and assuming that proper noise for each of the two filters is of 3 dB while that of the mixer is of 10 dB, it results as a function of the amplifier gain G:

$G = 10\ dB \quad F_T = 8\ dB$ $G = 13\ dB \quad F_T = 6.5\ dB$ $G = 15\ dB \quad F_T = 5.5\ dB$ that is an improvement of the receiver sensitivity by 2 db with G = 10 dB.

The selection of a bandwidth $\Delta f_o'$ wider that $\Delta f_o$ makes possible in a preselector associated to a transmitter-receiver to protect the mixer for transmission period. An automatic process switch 17 may be closed and untuned filter 9 no longer transmit signals from 14-1. Therefore the described circuits easily solve the problem of mixer protection.

As already mentioned, when desired electronic tuned bands are very wide, the above described devices may produce moderate results since varactor bias must vary over a large range and it is no longer possible to satisfy equalization conditions for coupling factor $u'$ without greatly increasing attenuation A'. The device, as shown in FIG. 6, makes it possible to overcome such a drawback.

Varactor 25 may be coupled either to parallel capacitor 26 or to assembly of the two capacitors 26 and 27. To do so varactor 25 is supplied through protection resistor 32 and insulating passage 30 from bias source V. Capacitor 27 has its under electrode connected to the top of strip 24, through PIN diode 28 that is supplied through a small surge inductor 29, an insulating passage 31 and a protection resistor 33 from another bias source $V_2$ which may have two values, either a positive value or null.

When source $V_2$ has a positive value, diode 28 has a very low resistance and the two capacitors 26 and 27 are parallel mounted with varactor 25. When the value of $V_2$ is null, resistor of 28 is very high and only capacitor 26 is in parallel with varactor 25. The other filter varactors being arranged in the same manner, it is possible with only one varactor bias source V and only one bias source $V_2$ supplying PIN diodes to cover band $\Delta F_0$ with two bands $\Delta F_0/2$. Such an arrangement may be used also in preselector-amplifier as shown in FIG. 5.

While the principles of the present invention have hereabove been described in relation with specific embodiments, it must be understood that the said description has only been made by way of example and does not limit the scope of this invention.

What is claimed is:

1. An improved midfrequency bandpass comb filter of the type having a casing consisting of a pair of opposing side walls, a plurality of parallel strips, and a number of first capacitors, each of said strips directly connected at one end to one of the side walls, and serially connected at the other end to the other of said side walls by means of each of said first capacitors wherein the improvement comprises:

a plurality of varactor diodes having first and second terminals, each of said varactor diodes in common connection with each of said first capacitors by means of said first terminals; and a first source of variable bias voltage, each of said varactor diodes in common connection with said first bias voltage by means of said second terminals, whereby the midfrequency is displaced in response to variations in bias voltage causing variations in capacitance to occur therein said varactor diodes.

2. The bandpass comb filter of claim 1 further including a plurality of second capacitors having first and second terminals, each of said second capacitors connected directly to the other of said side walls by means of said first terminals, and connected serially to the other end of said strip by means of said second terminals, and a plurality of pin diodes each of said pin diodes connected to said second capacitors by means of said second terminals, said filter further including a plurality of surge inductors each of said surge inductors commonly connected between said second capacitors by means of said second terminals, and a second bias voltage source, said pin diodes in combination with said second bias voltage thereby controlling electrical continuity between said second capacitors and said strips depending on bias voltage values applied thereto said pin diodes.

3. The bandpass comb filter of claim 2 further including first and second protection resistors, said first protection resistor serially connected between said first bias voltage source and said plurality of varactor diodes, and said second protection resistor serially connected between said second bias voltage source and said plurality of surge inductors.

4. The bandpass comb filter of claim 1 wherein said plurality of strips comprise four metal strips equidistantly located from each other and wherein said plurality of varactor diodes comprise four varactor diodes each of said four varactor diodes coupled with each of said four strips, and wherein each of said varactor diodes is connected in common with said first bias voltage source by means of four electrical connecting members extending through four insulated passages in the other of said side walls.

* * * * *